Patented July 10, 1951

2,560,235

UNITED STATES PATENT OFFICE 2,560,235

RUBBER AND CARBON BLACK MIXES DIRECTLY FROM NATURAL RUBBER LATEX

John McGavack, Leonia, and Chester E. Linscott, Ridgewood, N. J., assignors to United States Rubber Company, New York, N. Y., a corporation of New Jersey No Drawing. Application June 23, 1948, Serial No. 34,826

6 Claims. (Cl. 260—746)

1

This invention relates to methods of making rubber and carbon black mixes directly from natural (Hevea) rubber latex.

Many proposals have been made for producing rubber and carbon black mixes, or so-called rubber-carbon black masterbatches, directly from natural (Hevea) rubber latex, but these have all resulted in processes which are unsatisfactory for one reason or another. Mixing dry finely divided carbon black with fresh Hevea latex or with ammonia-preserved normal or concentrated Hevea latex results in immediate coagulation in coherent lump form without intimate mixture of the carbon black and rubber. The carbon black may be first dispersed in water, with or without the aid of dispersing agents, and then mixed with the latex to give an intimate mixture of the carbon black and rubber particles without spontaneous coagulation. Such product may be dried as such, which is undesirable by virtue of the necessity for thus removing large amounts of water, or the product may be coagulated by acid coagulants to a coherent lump coagulum, and the coagulum dried similarly to the conventional acid coagulated crude natural rubber. One disadvantage of all these proposed methods of preparing rubber-carbon black mixtures is the greatly increased difficulty of washing out the natural latex non-rubber constituents, and any dispersing agents or acid coagulants that may have been added, from the rubber-carbon black coagulum as compared with the washing out of the natural non-rubber constituents and the acid coagulants from the conventional rubber coagulum in the preparation of crude rubber, presumably by virtue of the great absorptive or holding power of the carbon black for these undesirable non-rubbers. Another disadvantage of these methods of incorporating carbon black in the crude rubber is the extremely high viscosity of the dry masterbatch which makes very difficult the milling necessary to further compound the rubber-carbon black mix in the manufacture of rubber articles.

According to the present invention, we have found a relatively simple method of producing natural rubber-carbon black mixes which eliminate the disadvantages attendant on the prior methods of making natural rubber-carbon black masterbatches.

The process of the present invention in its broadest aspect comprises mixing finely divided carbon black with a formaldehyde preserved natural rubber latex, whereupon a readily filterable slurry of particles of a rubber-carbon black mixture is formed, and separating the rubber-carbon black particles from the aqueous medium as by filtering, and drying. The carbon black may be added to the formaldehyde preserved latex in the dry form, as for example, powdered channel black or furnace black, and this is the present preferred manner of addition of the carbon black. The carbon black mixes satisfactorily with the formaldehyde preserved latex without the necessity for the addition of any wetting or dispersing agent. The carbon black becomes wetted by the formaldehyde preserved latex and stirs into it readily. This is different from the case of first preparing carbon black slurries in water without a wetting or dispersing agent. In attempting to prepare such aqueous slurries, the carbon black can only with difficulty be wetted by plain water and mixed therein unless a wetting agent is present. If desired, of course, the carbon black in the present case can be first suspended in water, with or without aid of a wetting agent before addition to the formaldehyde preserved latex, but this is unnecessary and undesirable from the point of view of the difficulty of dispersing the carbon black in water alone, or having to wash out added wetting agent or permitting it to remain at least in part in the rubber-carbon black masterbatch. After the carbon black has been mixed into the formaldehyde preserved latex, the rubber-carbon black particles may readily be washed with water to remove serum soluble constituents and various non-rubbers that have separated with the rubber-carbon black particles. The rubber particles in the formaldehyde-preserved latex may also very readily be washed to remove non-rubber ingredients before addition of the carbon-black, and this is preferred since it is much easier to wash the rubber particles than the particles of the rubber-carbon black mix for a variety of reasons: there is less bulk of straight rubber to wash than rubber-carbon black mix; the carbon black addition to the latex increases the amount of non-rubbers in the particles to be washed by pulling them out of the serum; and the rubber-carbon black particles have greater holding power for the non-rubbers than straight rubber particles, making it more difficult to wash them out.

The amount of formaldehyde added to natural latex to preserve the same is not critical and may be from 0.3% to 3% formaldehyde based on the latex weight. The latex containing the formaldehyde should preferably be allowed to stand about three days to assure adequate preservation before being subjected to the processes of the present invention. The time of standing will depend upon the amount of formaldehyde used. The thus preserved rubber particles in the latex contain combined formaldehyde, generally in amount from about 0.05% to 0.15% by weight based on the rubber. The pH of latex as it is tapped is about 7, and after addition of about 0.3% to 3% of formaldehyde, the pH drops on standing to within the range 5.3 to 6.3.

The amount of carbon black added to the formaldehyde preserved latex may be from 25 to 200 parts per 100 parts of rubber in the latex. All parts, ratios and percentages referred to in this specification are by weight. The addition of 50 to 60 parts of carbon black to 100 parts of rubber gives a rubber-carbon black mix which contains the necessary amount of rubber for the manufacture of a large majority of rubber products. Lower ratios of carbon black may be sufficient for some final rubber articles, and higher ratios of carbon black permit the manufacturer to add rubber to the rubber-carbon black masterbatch to give any desired ratio of rubber to carbon black in the final product.

When the carbon black is added to the formaldehyde preserved latex having the usual pH from about 5.3 to 6.3, the ratio of rubber to aqueous medium in the rubber-carbon black slurry is not critical and may be 30% or less depending on the ratio of carbon black to rubber. Generally the rubber should be about 3% to 15% based on the water phase with 50 or more parts of carbon black per 100 parts of rubber in order to give a slurry of optimum filterability. Water to give the desired dilution from the usual 38 to 42% solids latex as tapped may be added to the formaldehyde preserved latex before, with or after the addition of the carbon black. It is impractical to attempt to wash the non-rubbers from the rubber particles in the straight formaldehyde preserved latex where the pH is about 5.3 to 6.3, before addition of the carbon black, since such latex, whether diluted with water or not, takes too long a time to separate into cream flocs and serum to permit washing of the rubber particles before the carbon black addition. It is known that formaldehyde preserved latex will cream on standing after dilution, but such creaming may be a matter of days or even weeks. When the carbon black is added to formaldehyde preserved latex, the carbon black flocculates the rubber particles so that they may then be readily separated from the aqueous medium and washed to remove non-rubbers. At concentrations of rubber below about 15% on the aqueous phase in the aqueous slurry of rubber and carbon black particles where the ratio of carbon black to rubber is 1 to 2 or greater, these amounts of water will be such that the rubber and carbon black particles will flocculate and separate on standing, leaving sufficient water to permit practicable filtering. The rubber-carbon black particles may be washed by repeated water additions and filtering, decanting, centrifuging, or the like, and the final intimate mixture of carbon black and rubber may be dried in conventional driers and baled.

By modifications or improved procedures of the process of the present invention, the rubber particles in the formaldehyde preserved latex may be washed free of natural non-rubbers before the carbon black addition, in which case the more difficult removal of non-rubbers from the rubber-carbon black mixture is obviated. The rubber particles in the formaldehyde preserved latex may be first washed and non-rubbers removed by either raising the pH of the latex to within the range of 7 to 11 as by addition of ammonia, amines or alkali-metal hydroxide, or by lowering the pH of the latex to within the range of 4.3 to 0.5 as by the addition of any common acid such as sulfuric, sulfurous, formic, acetic, oxalic acid or the like, and diluting the thus treated formaldehyde preserved latex, preferably to about 1 to 15% solids concentration. Such raising or lowering the pH of the formaldehyde preserved latex before addition of the carbon black even without creaming permits easier mixing of the carbon black into the latex. The rubber particles in such a diluted formaldehyde preserved latex, the pH of which has been adjusted to 7 or above or to 4.3 or below, will readily flocculate and form a cream layer of about 10% to 30% solids concentration depending on the amount of dilution and the pH. The thus formed cream and serum fractions may be readily separated as by drawing off the subnatant serum layer. Generally, the solids concentration of the cream from such treated latices above pH of about 8.5 will be about 15% to 30%, and from such treated latices below pH of about 4 will be about 10% to 18%. The flocculated rubber particles in the separated cream may be washed with water to further remove non-rubbers. Generally sufficient alkali or acid will be present in the cream to maintain the pH of the diluted rubber flocs above 7 or below 4.3 to give the desired fast flocculation which is not obtained with the dilution of formaldehyde preserved latex in pH range of 5.3 to 6.3. Where the pH of the latex is lowered to within the range 1.2 to 2.8, the serum under the flocculated rubber particles will not be clear as is the case where the pH is lowered to within the range 2.8 to 4.3 or to below 1.2, but the rubber particles nevertheless will quickly flocculate in this range on admixture with carbon black, and may be readily washed, although possibly with some loss of rubber in the serum. Reference is made to our Patents Nos. 2,213,321 and 2,327,115 for further details of flocculating and washing rubber particles in formaldehyde preserved latex at pH's above and below the normal pH range of 5.3 to 6.3. The carbon-black may be added in the dry powdered state directly to the thus washed creams of 10% to 30% solids concentration with easy wetting of the carbon black and mixing with the creams. If desired, water may be added before, during or after the addition of the carbon black to improve the handling, especially with the higher concentration of the creams, and where the ratio of carbon black to rubber is relatively high, as fifty or more parts of carbon black per hundred parts of rubber. The concentation of rubber in the rubber-carbon black slurry for optimum handling may readily be determined for any given case. The rubber-carbon black slurry in which the rubber particles have been separately washed may be filtered and dried with or without washing of the rubber-carbon black particles, as desired. The rubber-carbon black mixes of the present invention dry faster than crude rubber.

The rubber in the rubber-carbon black mixes of the present invention contains combined formaldehyde in amount from about 0.05% to 0.15% based on the rubber, and is softer than the usual rubbers of commerce, such as pale crepe and smoked sheet. The rubber-carbon black mixes of the present invention may be compounded on a mill with accelerators, antioxidants, etc., to produce a vulcanized rubber-black stock having good physical properties, e. g. tensile strength, tear resistance, abrasion and aging, as compared with rubber-black stocks where the carbon black is milled directly into the crude rubber, e. g. pale crepe or smoked sheet. The rubber-carbon black mixes of the present invention can, if desired, be directly added to a Banbury mixer and compounded with accelerators, antioxidants, etc., without previously breaking it down on a mill. The time in the Banbury is less than when carbon black is mixed with smoked sheet or crepe rubber. One of the outstanding features of the present invention is the time and power saved, as well as the ease with which the product can be handled.

The following examples are illustrative of the invention:

Example I 1500 grams of latex of 39.1% total solids and preserved with 0.4% formaldehyde and aged several months was added to 10,220 grams of water. 293 grams of powdered (uncompressed) carbon black were stirred into the diluted latex with a blade rotating at 1750 revolutions per minute (R. P. M.) and having a peripheral velocity of 14,400 inches per minute. After forty minutes of such stirring, the rubber and black were well combined in a slurry of fine crumbs. With a blade rotating at 172 R. P. M. and a peripheral velocity of 4330 inches per minute, the rubber and carbon black did not combine well in one hour. The slurry was filtered on a Buchner funnel yielding 9383 grams of a filtrate of pH 5.8 and containing 0.34% solids. The filter cake was dry after 60 hours at 42° C. and had a weight of 815 grams.

Example II 1500 grams of latex, preserved with 0.4% formaldehyde and aged several months and having 39.1% total solids, was added to 10,220 grams of water to bring it to a concentration of 5% solids. The diluting water contained 4.5 grams of 90% formic acid. After thorough mixing of the diluted acidified latex, it was poured immediately on 293 grams of uncompressed carbon black and stirred with a blade rotating at 172 R. P. M. and having a peripheral velocity of 4330 inches per minute. A thick black well combined slurry was produced in seven minutes' stirring. The carbon black went into the latex to which the acid had been added more readily than into the latex in Example I where the pH of 5.8 was not changed. After 15 minutes the resulting slurry was rapidly filtered on a Buchner funnel, giving 9525 grams of a clear and almost colorless filtrate of pH 4.2 and containing 0.34 solids. The filter cake was dry after 37 hours at 42° C. and weighed 824 grams.

Example III 124 grams of latex of 40.3% total solids and preserved with 0.4% formaldehyde and aged several months were stirred with 7 cc. of 10% ammonia for ten minutes to aggregate the latex. The aggregated latex was diluted with 293 grams of water, and added to 24 grams of powdered carbon black with hand stirring, followed by high speed stirring with a blade rotating at 12,000 R. P. M. and having a peripheral velocity of 33,000 inches per minute and with further dilution with water to 10% latex solids. A fine well combined gelatinous black slurry formed in two minutes. The slurry filtered rapidly on a Buchner funnel giving 305 grams of a clear greenish yellow filtrate of pH 9.5. About one-half the original water-soluble non-rubber constitutents of the latex were removed in the filtrate. The filter cake was dried at 42° C. to constant weight of 68 grams.

Example IV 1500 grams of latex having a total solids content of 39.1% and preserved with .4% formaldehyde and aged several months, was treated with 4.5 grams of dilute formic acid and sufficient water to bring the concentration to 5%. After stirring slowly in order to mix the acidified water and latex together, it was allowed to stand for 16 hours. The latex creamed, giving 6265 grams of a clear yellow serum, having a pH of 4.1 with a total solids of .43%, and 54.75 grams of a 10.2% total solids cream. The serum was separated from the cream and 293 grams of carbon black in a dry powdered state, were combined directly with the cream and stirred with a blade rotating at 172 R. P. M. for a total of 15 minutes. The black, after introduction, dispersed through the latex in about one minute, and, at the end of 15 minutes' stirring, the slurry was of uniform appearance. The slurry was then readily filtered on a Buchner funnel and, after breaking the filter cake up readily, was dried at 42° C. with a mild current of air passing over the surface of the drying material. Drying was completed in 42 hours with a recovery of 825 grams of a black-rubber mixture.

Example V

To 28,640 grams of latex, having a total solids content of 39.6, was added .4% formaldehyde based on the latex directly after tapping. After 3 days it was diluted with 226,400 grams water to bring it to a concentration of 5% solids. Formic acid was then added to bring the pH to 3.95. Creaming occurred after 19 hours, and a clear yellow serum was drained. Sufficient serum was removed such that the final concentration of the cream was 11.3% solids. To this cream was then added dry uncompressed carbon black in an amount equal to half the washed weight of the total solids of the cream. The carbon black was stirred in by a blade rotating at 1430 R. P. M. After about 2 minutes' stirring the mixture formed a soft continuous gel structure which broke up on further stirring to a fine slurry. This was filtered through a Buchner funnel readily and the filter cake broken up into a fine crumb and dried at a slightly elevated temperature (120° F.) in 3 days. Approximately 15,000 grams of dried rubber-carbon black mix were recovered.

Example VI 282 grams of latex of 39.1% total solids and preserved with 0.4% formaldehyde and aged several months was diluted with 268 grams of water and added to 1650 grams of water containing 12 cc. of 10% ammonia. This was stirred and allowed to stand. After agitation with a high speed stirrer, a coarse flocculated material appeared and rose to the surface. The cream weighed 221.6 grams and contained 26.78% solids. The serum weighed 1905 grams and contained 2.73% solids. The cream was separated from the serum and added to 30 grams of powdered carbon black. By hand stirring, the mixture became thick and was readily filtered on a Buchner funnel giving a colorless filtrate of pH 7.68. The filter cake was dried to a constant weight of 81.9 grams in 20 hours at 48° C.

Example VII 128 grams of latex of 39.1% total solids and preserved with 0.4% formaldehyde and aged several months were stirred with 5 cc. of 10% ammonia until aggregated. The aggregated latex was diluted with 867 grams of water, the aggregates allowed to rise, and after about 2 hours 771 grams of serum of 1.16% solids was removed from the cream of aggregates. The pH of the serum was 9.1. 222 grams of cream thus obtained were treated with 4 cc. of 28% ammonia. 85 grams of water were added and the mix stirred for three minutes at high speed. 20 grams of powdered carbon black were then slowly added with high speed stirring. The mix shortly became thickened. After thorough combination of black and rubber, the slurry was readily filtered, yielding 289 grams of a filtrate that was almost clear with a pH of 10.0. The filter cake dried to constant weight after 16 hours at 48° and weighed 64.4 grams.

In view of the many changes and modifications that may be made without departing from the principles underlying the invention, reference should be made to the appended claims for an understanding of the scope of the protection afforded the invention.

Having thus described our invention, what we claim and desire to protect by Letters Patent is:

1. A method of making a natural rubber-carbon black mix which comprises mixing carbon black with a formaldehyde preserved latex containing 0.3 to 3% by weight of formaldehyde and which has been allowed to age at least three days, whereby to form a readily filterable aqueous slurry of rubber and carbon black particles, the ratio of carbon black to rubber being in the range 25 to 200 parts by weight of carbon black per 100 parts of rubber, and the concentration of rubber in said slurry being in the range 3 to 30% by weight based on the aqueous phase, and separating the mixture of rubber and carbon black particles in said slurry from the aqueous medium.

2. A method of making a natural rubber-carbon black mix which comprises mixing carbon black with a formaldehyde preserved latex having a pH from 5.3 to 6.3 and which contains 0.3 to 3% by weight of formaldehyde and has been allowed to age at least three days, whereby to form a readily filterable aqueous slurry of rubber and carbon black particles, the ratio of carbon black to rubber being in the range 25 to 200 parts by weight of carbon black per 100 parts of rubber, and the concentration of rubber in said slurry being in the range 3 to 15% by weight based on the aqueous phase, and separating the mixture of rubber and carbon black particles in said slurry from the aqueous medium.

3. A method of making a natural rubber-carbon black mix which comprises lowering the pH of a formaldehyde preserved latex containing 0.3 to 3% by weight of formaldehyde and which has been allowed to age at least three days to within the range 4.3 to 0.5, mixing carbon black therewith to form a readily filterable aqueous slurry of rubber and carbon black particles, the ratio of carbon black to rubber being in the range 25 to 200 parts by weight of carbon black per 100 parts of rubber, and the concentration of rubber in said slurry being in the range 3 to 30% by weight based on the aqueous phase, and separating the mixture of rubber and carbon black particles in said slurry from the aqueous medium.

4. A method of making a natural rubber-carbon black mix which comprises raising the pH of a formaldehyde preserved latex containing 0.3 to 3% by weight of formaldehyde and which has been allowed to age at least three days to within the range 7 to 11, mixing carbon black therewith whereby to form a readily filterable aqueous slurry of rubber and carbon black particles, the ratio of carbon black to rubber being in the range 25 to 200 parts by weight of carbon black per 100 parts of rubber, and the concentration of rubber in said slurry being in the range 3 to 30% by weight based on the aqueous phase, and separating the mixture of rubber and carbon black particles in said slurry from the aqueous medium.

5. A method of making a natural rubber-carbon black mix which comprises lowering the pH of a formaldehyde preserved latex containing 0.3 to 3% by weight of formaldehyde and which has been allowed to age at least three days to within the range 4.3 to 0.5 and diluting to 1 to 15% solids concentration, allowing the thus treated latex to cream, separating the cream and serum fractions, and adding carbon black to the cream portion whereby to form a readily filterable aqueous slurry of rubber and carbon black particles, and separating the mixture of rubber and carbon black particles in said slurry from the aqueous medium.

6. A method of making a natural rubber-carbon black mix which comprises raising the pH of a formaldehyde preserved latex containing 0.3 to 3% by weight of formaldehyde and which has been allowed to age at least three days to within the range 7 to 11 and diluting to 1 to 15% solids concentration, allowing the thus treated latex to cream, separating the cream and serum fractions, and adding carbon black to the cream portion whereby to form a readily filterable aqueous slurry of rubber and carbon black particles, and separating the mixture of rubber and carbon black particles in said slurry from the aqueous medium.

JOHN McGAVACK.
CHESTER E. LINSCOTT.

REFERENCES CITED

The following references are of record in the file of this patent:

UNITED STATES PATENTS

| Number | Name | Date |
|---|---|---|
| 1,611,278 | Petersen | Dec. 21, 1926 |
| 1,802,761 | Gibbons | Apr. 28, 1931 |
| 1,872,161 | McGavack | Aug. 16, 1932 |
| 2,289,672 | Merrill | July 14, 1942 |
| 2,327,115 | Linscott et al. | Aug. 17, 1943 |